United States Patent [19]

Diepers

[11] 4,306,169

[45] Dec. 15, 1981

[54] CURRENT TRANSFER BRUSH

[75] Inventor: Heinrich Diepers, Höchstadt, Fed. Rep. of Germany

[73] Assignee: Siemens Aktiengesellschaft, Munich, Fed. Rep. of Germany

[21] Appl. No.: 43,215

[22] Filed: May 29, 1979

[30] Foreign Application Priority Data

Apr. 20, 1978 [DE] Fed. Rep. of Germany ....... 2817402

[51] Int. Cl.[3] .............................................. H02K 13/00

[52] U.S. Cl. ...................................... 310/248; 310/249; 310/251

[58] Field of Search ................................ 310/248–253, 310/245, 239

[56] References Cited

U.S. PATENT DOCUMENTS

| | | | |
|---|---|---|---|
| 3,525,006 | 8/1970 | Parr | 310/252 |
| 3,668,451 | 6/1972 | McNab | 310/251 |
| 3,886,386 | 5/1975 | Hillig | 310/251 |

FOREIGN PATENT DOCUMENTS

| | | | |
|---|---|---|---|
| 609792 | 11/1960 | Canada | 310/248 |
| 1093895 | 12/1960 | Fed. Rep. of Germany | 310/248 |
| 2316796 | 10/1974 | Fed. Rep. of Germany | 310/248 |
| 2329698 | 1/1975 | Fed. Rep. of Germany | 310/248 |
| 1003791 | 3/1952 | France | 310/248 |

*Primary Examiner*—R. Skudy

*Attorney, Agent, or Firm*—Kenyon & Kenyon

[57] ABSTRACT

In a current transfer brush which includes a frame element holding together a flexible slider member containing several graphite fibers which are at least partly coated with an electrically conducting material, the slider member is made of a stack of a plurality of mats of highly graphitized graphite fibers, the mats extending at least approximately perpendicular to the contact surface of the brush with at least some of the fibers in mats coated with an electrically conducting material in order to give improved electrical characteristics for the brush over brushes utilizing a graphite block as the slider member, with the brush particularly useful in commutator machines.

17 Claims, 2 Drawing Figures

CURRENT TRANSFER BRUSH

BACKGROUND OF THE INVENTION

This invention relates to current transfer brushes in general and more particularly to a contact brush with several graphite fibers which are combined to form a slider member and are coated, at least partly, by an electrically conducting material.

The brushes used in electrical machines are used for current transfer between a fixed and a rotating machine part. Good electrical conductivity of the brush and, at the same time, good sliding characteristics on the contact member connected to the rotating machine part, such as a slip ring or a commutator, are assured through the use of graphite. The running characteristics of such a brush are determined mainly by the friction coefficient $\mu$ as a function of the circumferential velocity of the contact member connected to the rotating machine part and by the voltage drop $\Delta U$ as function of the current density transferred via the brush. Both quantities depend to a large extent on the alien skin which forms on the rotating contact member and is also called film or patina. This alien skin is composed of materials of the brush slider member and of the contact member abraded during operation. Its thickness and nature are influenced by a multiplicity of factors. It is determined, for instance, by the material composition of the graphite and of the contact member, by the intended current density as well as by the circumferential velocity and the temperature of the contact member. It also depends on the contact pressure of the brush and, in particular, on the constantly changing influences of the atmosphere, such as ground and altitude climate, relative humidity, and chemically aggressive gases and vapors.

The slider members of such graphite brushes may contain a multiplicity of carbon or graphite fibers, combined to form a bundle and coated by a metal film of high electrical conductivity (British Pat. No. 1,191,234). Therein, graphite fibers in the form of a rope of several thousand individual fibers serve as starting material. Suitable fibers are known from British Pat. No. 1,110,791, for instance. The advantage of these fiber brushes over the known brushes having an electrographite block is that considerably more points of contact between the sliding member and the rotating contact surface are present, that the fibers are very elastic, and that the electrical characteristics and the running characteristics of the brush are thus improved.

The manufacture of such brushes and, above all, the metallizing of the graphite fibers is relatively costly, however. In addition, only a limited selection of metals can be applied to the graphite fibers by the known methods of currentless or galvanic deposition. Moreover, there are problems with these methods in achieving satisfactory adhesion and high conductivity. Precoating with a carrier material onto which the desired metal can only then be deposited may possibly be required.

SUMMARY OF THE INVENTION

Therefore, it is an object of the present invention to provide a current transfer brush in which these difficulties either do not occur or occur only to an insignificant degree. In particular, the brush should permit a relatively light contact pressure even at high circumferential speeds and yet have a relatively low contact resistance. Moreover, this brush should be applicable to all machine types, i.e., to slip rings and commutators.

According to the present invention, this problem is solved for a current transfer brush of the kind mentioned at the outset in that its sliding member contains a stack arrangement of highly graphitized graphite fiber mats and/or felts extending, at least approximately, perpendicular to the contact surface of the brush.

A highly graphitized graphite is here understood to mean a graphite material which contains a high percentage of crystallized graphite. This material is particularly well suited for brushes because its sliding characteristics on metallic contact members such as slip rings or commutators are very good.

The advantage of this current transfer brush consists further in that graphite fiber mats or felts are relatively simple to handle, and large areas of them can be coated in one operation. In addition, a homogeneous current distribution over the entire mat is made possible by a random distribution of the fiber pieces. The mutual mechanical fixation within the mat or felt plane also contributes to the establishment of an homogeneous current distribution.

The processing into a brush slider member is accomplished in a simple manner by stacking a relatively small number of mats, whereas a multiplicity of stacking operations with rope on rope must be carried out using the known fiber rope.

Furthermore, the graphite fiber mats or felts oriented perpendicular to the contact surface of the electrical machine are relatively flexible so that, in connection with the laminar construction of the brush, a high contact point density is attainable in the contact surface. The running characteristics of the brush are improved by the flexibility of the mats or felts and by the laminar structure. Although the momentary brush contact pressure varies due to the uneven running of the rotating machine part, which can never be prevented completely, a relatively constant transfer resistance between the rotating contact member and the contact brush is assured just the same.

Also, better brush cooling as compared to a slider member with an electrographite block is achieved due to the stack arrangement of the mats or felts. The cooling effect by the slip stream is particularly good when the mats or felts are disposed perpendicular to the axis of rotation of the machine's contact member.

Beyond this, the sliding member is of pronouncedly anisotropic design; for, in the mat or felt plane, i.e., in the current transfer direction, its electrical and thermal conductivity is considerably greater than perpendicular thereto. Such a current transfer brush is particularly well suited as a commutator brush. It influences the commutation both electrically and mechanically because, as is known, the transfer resistance, the stability of the resistance at high current densities, and the number of contact points have a great influence on the commutation quality of the machine. As is known, the mechanical running characteristics affect the commutation time, which is shortened in an unreproducible manner. For, spark formation may occur, despite perfect mechanical conditions, if the brush does not provide the transition resistance required in the short-circuit loop of the commutating coil at high longitudinal current loading in the foil plane. By designing the current transfer brush in accordance with the present invention, this difficulty is circumvented in that, due to the laminated slider member, additional resistance is added to the transition resistance in the current flow direction in the commutation circuit by the addition of the transition resistance between adjacent graphite fiber mats or felts. Furthermore, according to a further embodiment of the current transfer brush, an additional resistance increase in the commutation circuit is obtained in that graphite fiber mats or felts of greater electrical conductivity in the current transfer direction in the mat or felt plane than in the direction perpendicular thereto are used.

DETAILED DESCRIPTION OF THE INVENTION

Figure 1:
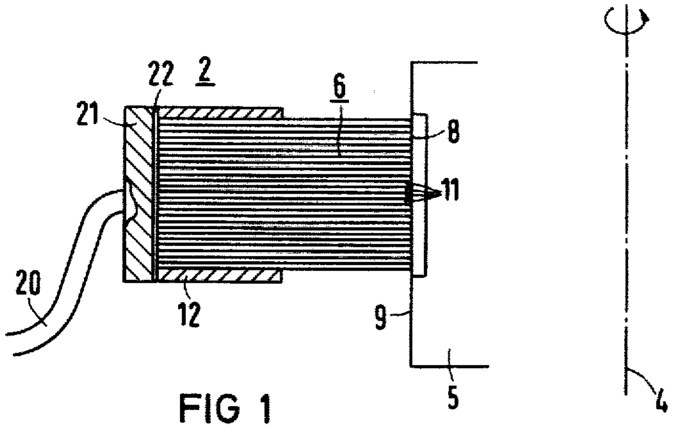
FIG. 1 is a schematic illustration of a current transfer brush according to the present invention.

The brush 2, shown in FIG. 1 in transverse section, is connected to a fixed machine part of an electrical machine not shown in the Figure. For current transfer between this fixed machine part and a machine part 5, which is only indicated in the Figure and rotates about an axis 4, the sliding member 6 of brush 2 slides on the cylindrical outside or running surface 8 of a contact member 9 connected to the rotating machine part 5. It is assumed in the embodiment of FIG. 1 that the running surface 8 is the contact surface of the commutator 9 of a commutator machine. However, the running surface 8 may also be the contact surface of a slip ring of a D.C. or A.C. machine.

According to the present invention, the sliding member of the brush contains a stack arrangement of a multiplicity of graphite fiber mats or graphite fiber felts whose fibers are coated by an electrically highly conducting material. According to the embodiment of FIG. 1, the slider member 6 is composed of coated graphite fiber mats 11. Their ends away from the rotating machine part 5 are held together mechanically by a frame element 12 such as a copper frame.

With respect to the running surface 8 of the machine's rotating commutator 9, the brush 2 is arranged so that its coated mats 11 are perpendicular to this running surface 8. Moreover, in the case of the assumed commutator machine, the flat sides of these coated graphite fiber mats 11 advantageously lie in planes perpendicular to the axis of rotation 4 of the rotating machine part. For, with this arrangement of the graphite fiber mats 11, excessive distortion of the individual mats in the rotation direction is prevented despite the flexibility of the slider member 6, and an approximately constant size of the slider member 6 relative to the dimensions of the commutator segments covered by it is assured.

In the case of D.C. or A.C. machines with slip rings forming the rotating contact members, the brush may also be arranged so that its graphite fiber mats 11 lie in planes parallel to the axis of rotation 4.

For the manufacture of the coated graphite fiber mats 11, commercial mats of randomly arranged, uncoated graphite fibers cut short and having a high degree of graphite crystallization may be used as the starting material (e.g., Toray Industries, Inc., Tokyo/Japan: Torayca Mat A0-010). Such mats have a density of, for instance, 10 $g/m^2$ and a thickness of less than 0.5 mm, preferably below 100 $\mu m$. The graphite fibers are of polyacryl nitril, for instance, and are held together by a binder such as phenol-formalin synthetic resin, the percentage of binder in the mat being approximately 5 to 9 percent by weight.

The fibers of this still uncoated graphite fiber mat are then coated with an electrically conducting material such as copper or a two or more component alloy. Preferably a silver layer is provided. Three appropriate fiber pieces 13, 14 and 15 of such a graphite fiber mat are shown enlarged in FIG. 2. Each one of these fiber pieces contains a graphite fiber core 16 to which is applied a layer 17 of the electrically conducting material. This layer may be applied in accordance with the known thin film methods such as by electroless or electro deposition. These chemical processes generally entail the difficulty that the electrically conducting material to be applied adheres poorly to the graphite material. Therefore, separate carrier layers of a better adhering material are often required for the electrically conducting material. In addition, particularly when thin mat or felt thicknesses are involved, the binder material keeping the fibers together cannot be removed prior to the coating operation because the mats or felts would otherwise be of insufficient strength and would, therefore, dissolve in the baths required for these chemical processes. Metallizing the fibers by ion plating is particularly advantageous. Ion plating is here understood to be an evaporation process in which the atoms or molecules to be deposited are ionized in part in a plasma impinging on the graphite part to be coated in an electrical field with higher energy ("Vakuumtechnik," 1976, pages 65 to 72 and 113 to 120). In this method, a nickel carrier film which is required for electroplating processes, for instance, and through which the adhesion of the electrically conducting material, e.g., silver, to the graphite material is improved on the one hand and a good base for nucleus formation for the silver cover layer is provided on the other, may be omitted. Yet, good adhesion as well as good nucleation of the silver on the graphite are obtained by this coating method so that the conductivety of the silver cover layer matches, at least approximately, that of solid silver.

Prior to the ion plating operation, it is expedient to remove from the graphite fiber mats binder material such as the phenol-formalin synthetic resin which may be present. This binder material may be removed, for example, by burning it off in air at 400° C. and, if applicable, an additional degassing operation may subsequently be carried out on the remaining graphite material, for instance, at 700° to 800° C. in high vacuum for about 1 hour.

The thickness of the layers of electrically conducting material thus applied may be, for example, between 0.1 $\mu m$ and 50 $\mu m$, preferably between 0.3 $\mu m$ and 5 $\mu m$.

Figure 2:
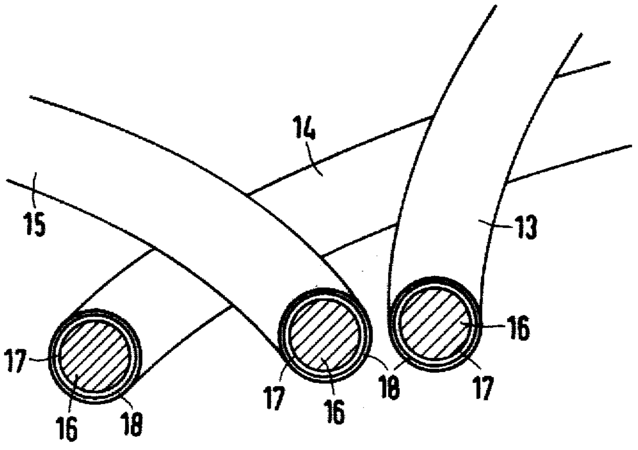
FIG. 2 is an enlarged perspective detail of a graphite fiber mat for such a brush.

As further shown in FIG. 2, the layers 17 of electrically conducting material are covered in addition by a thin film 18. For, it may be advantageous, particularly when using the brushes according to the present invention, in dry climates, to additionally apply to the layers 17 of electrically conducting material friction reducing films such as of molybdenum disulfide, $MoS_2$, or niobium diselenide $NbSe_2$ because the lubricating powers of dry graphite are poor, as is known. Depositing these friction reducing films 18 is also preferably accomplished by ion plating. The films 18 may additionally serve as corrosion protection for the material of the layers 17. In this manner, a silver layer, for instance, can be shielded against being affected by sulfur from the atmosphere.

Deviating from the embodiment of FIG. 2, different layer thicknesse and also possibly different materials may be applied to the graphite fibers of different mats.

However, it is difficult to solder the graphite fiber mats 11 shown in FIG. 1, combined to form a stack and coated with an electrically conducting material, to a current lead-in or lead-out wire at their ends located in the copper frame 12. As further indicated in this Figure, these ends are, therefore, connected, in an electrically conducting manner, to a contact plate 21 joined to the current lead-in or lead-out wire, such as a copper rope 20, by means of a conducting adhesive layer 22. Suitable conducting adhesives are, for instance, conducting silver pastes, conducting epoxy adhesives, or conducting silicone adhesives which contain electrically conducting material in finely powderized form and are hardened by heat treatment or also at room temperature. In the case of the commutator brush it is expedient to select the conductivity of the adhesive and to make the layer thickness thin enough so that the high shunt resistance of the slider member 6 is not bridged substantially. The same applies analogously also to the material of the contact plate 21 and its geometric dimensions.

Due to the coating of the graphite fiber mats 11 by an electrically conducting material there is provided a kind of composite brush, the electrically conducting parts of the brush providing for particularly good current carrying capacity and heat dissipation while the graphite parts of the brush serve as carrier material for these electrically conducting layers 17 and as a lubricant.

In the current flow direction, i.e., parallel to the mat planes, the resistance of the sliding members 6 of brush 2 is very low. The heat generated in the contact surface can be dissipated quickly along the mats in the direction of the brush frame 12 so that the contact temperature is kept correspondingly low, particularly even at loads several times higher than the load limits of the brushes presently used. In addition, the electrical load on the brush, for instance its current density, can be increased to a multiple of the load limit of the hitherto used brushes, even at speeds of 80 m/sec. Therefore, application of the brush in peak performance turbogenerators is possible.

By suitably selecting the thickness and the raw density of the graphite mats or graphite felts, the thickness of the metal films applied to them which, if applicable, may differ in thickness and consist of different materials, and the packing or stacking density, the brush according to the present invention can be adapted optimally to various machine types without thereby necessitating significant changes in the manufacture of the brushes. Beyond this, a locally differing current density can be established through the use of coated and uncoated mats or felts, it being possible to provide both mats and felts at the same time for one slider member, as well as through their predetermined mutual configuration. It also may be of advantage to provide uncoated graphite fiber mats or felts, or graphite fiber mats or felts coated thinly with less highly conducting material whose resistance is, therefore, higher at the trailing and leading brush edge.

Particularly for application as commutator brush, it may be advantageous to provide films of a high melting point material with low vapor pressure at elevated temperatures in order to thus render spark formation more difficult at the trailing brush edge, for instance, so that it will transfer less brush material.

According to one example, a current transfer brush according to the present invention contains 160 graphite fiber mats, each having a "raw" density of 10 g/m$^2$, a thickness of 80 $\mu$m, a length of about 5 cm and a width of 2 cm. Commercial graphite fiber mats are provided as mat material (Toray Industries Mat A0-101). The mat material is pronouncedly anisotropic regarding its thermal and electrical conductivity. The fibers of this initially untreated graphite fiber mat are provided with a sputtered on silver film 1 $\mu$m thick. The graphite fiber mats, combined to form a stack, are held in a copper frame having a square $2\times2$ cm inside opening and electrically connected to a copper rope by means of a conducting silver paste. Provided as the contact member of a rotating machine part is a silver slip ring which moves under the brush at a circumferential speed of 42 m/sec. For this brush, a very low voltage drop $\Delta U$ of about 0.18 V occurs at a current density of 40 A/cm$^2$ over the entire brush including the contact zone when negatively poled.

It is assumed in the example and in the Figures that current is transferred between a rotating and a fixed machine part by means of the brush according to the present invention. However, the use of this brush is not restricted to cylindrical contact surfaces 8. The brush may equally well be provided for use on stationary, long current collecting bars.

Further as used herein, particularly in the claims, fiber mats are considered a generic term including both mats and felts.

What is claimed is:

1. In a current transfer brush including flexible slider member containing a plurality of graphite fibers at least partially coated with an electrically conducting material and a frame element holding the fibers together at the end of the brush facing away from its contact surface, the improvement comprising, the slider member made of a flexible stack of a plurality of mats of highly graphitized graphte fibers, said mats directly adjacent each other extending at least approximately perpendicular to the contact surface of the brush, at least some of said mats coated with an electrically conducting material, said frame holding said mats only at the end of said mats facing away from the contact surface of the brush.

2. The improvement according to claim 1 wherein said graphite fiber mats have a greater electrical and thermal conductivity in the current transfer direction in the mat plane than in a direction perpendicular thereto.

3. The improvement according to claim 1 wherein said graphite fiber mat has a thickness under 0.5 mm, preferably under 100 $\mu$m.

4. The improvement according to claim 1 wherein graphite fiber mats of different thickness are included in said slider member.

5. The improvement according to claim 1 wherein said slider member includes both coated and uncoated graphite fiber mats.

6. The improvement according to claim 1 wherein said electrically conducting material is selected from the group consisting of copper, silver and an alloy of at least one of copper and silver.

7. The improvement according to claim 6 wherein the thickness of said layers of electrically conducting material applied to the graphite fibers is between 0.1 $\mu$m and 50 $\mu$m, preferably between 0.3 $\mu$m and 5 $\mu$m.

8. The improvement according to claim 7 wherein said layers of the electrically conducting material applied to the graphite fibers of different mats have different thicknesses.

9. The improvement according to claim 1 wherein the graphite fibers of different mats are coated with different electrically conducting materials.

10. The improvement according to claim 1 and further including a layer of a friction reducing material applied to the graphite fibers of the mats.

11. The improvement according to claim 10 wherein said friction reducing material is selected from the group consisting of molybdenum disulfide $MoS_2$ and niobium diselenide $NbSe_2$.

12. The improvement according to claim 1 wherein the graphite fibers of at least some of the mats are provided with a layer of high melting point material.

13. The improvement according to claim 1 in combination with the contact member of a machine wherein the flat sides of the graphite fiber mats are arranged in planes perpendicular to the axis of rotation of the contact member.

14. The improvement according to claim 6 and further including a layer of a friction reducing material is applied to the coated graphite fibers of the mats.

15. The improvement according to claim 14 wherein said friction reducing material is selected from the group consisting of molybdenum disulfide $MoS_2$ and niobium diselenide $NbSe_2$.

16. The improvement according to claim 1 wherein said said mats of highly graphitized graphite fibers consist of felts of said graphite fibers.

17. The improvement according to claim 1 and further including a current lead extending from said frame element and a conductive adhesive establishing contact between said graphite fiber mats and said frame element thereby establishing an electrically conducting connection with said current lead.

* * * * *